(12) United States Patent
Zaccardi et al.

(10) Patent No.: US 11,814,987 B2
(45) Date of Patent: Nov. 14, 2023

(54) TURBINE ENGINE COMPRISING A STRAIGHTENING ASSEMBLY

(71) Applicant: SAFRAN AIRCRAFT ENGINES, Paris (FR)

(72) Inventors: Cédric Zaccardi, Moissy-Cramayel (FR); Kaëlig Merwen Orieux, Moissy-Cramayel (FR); William Henri Joseph Riera, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/167,951

(22) Filed: Oct. 23, 2018

(65) Prior Publication Data

US 2019/0120071 A1   Apr. 25, 2019

(30) Foreign Application Priority Data

Oct. 23, 2017   (FR) ...................................... 1759977

(51) Int. Cl.
   *F01D 9/04* (2006.01)

(52) U.S. Cl.
   CPC .............. *F01D 9/041* (2013.01); *F01D 9/042* (2013.01); *F05D 2240/12* (2013.01);
   (Continued)

(58) Field of Classification Search
   CPC ..... F01D 9/00; F01D 9/02; F01D 9/04; F01D 9/041; F01D 9/042; F01D 5/282;
   (Continued)

(56) References Cited

U.S. PATENT DOCUMENTS

| 5,131,808 A | * | 7/1992 | Ciais | ....................... F01D 5/282 |
| | | | | 415/135 |
| 5,399,069 A | * | 3/1995 | Marey | ..................... F01D 9/042 |
| | | | | 415/189 |

(Continued)

FOREIGN PATENT DOCUMENTS

| EP | 2412931 A2 | 2/2012 |
| WO | WO 2014/076408 | 5/2014 |
| WO | WO 2017/187093 A1 | 11/2017 |

OTHER PUBLICATIONS

Break. Dictionary [online]. Merriam-Webster, 2022 [retrieved on Jan. 28, 2022]. Retrieved from the Internet: <URL: https://www.merriam-webster.com/dictionary/break> (Year: 2022).*

(Continued)

*Primary Examiner* — Elton K Wong
(74) *Attorney, Agent, or Firm* — Cozen O'Connor (57) ABSTRACT

The invention relates to a straightening assembly (28) comprising two radially inner and outer coaxial shells (34) between which extend vanes (36) made of composite material, fixed to a first end portion on the radially inner shell and to a second end portion on the radially outer shell, characterized in that:
   for each vane (36), in a plane perpendicular to the axis of the radially inner and outer shells (34), a straight line passing through a junction between said first and second end portions and the useful part forms an angle α with a radius of the radially inner shell, passing through the junction between said first end portion and the useful part of said vane (36), such that 0°<α≤30°;
   the radially inner shell has a diameter ranging from 1,000 mm to 1,600 mm; and in that
   the radially outer shell has a diameter ranging from 2,000 to 2,800 mm;

(Continued)

the number of vanes (36) ranges from twenty-five to forty-five.

19 Claims, 5 Drawing Sheets

(52) U.S. Cl.
CPC ...... *F05D 2250/15* (2013.01); *F05D 2260/31* (2013.01); *F05D 2300/603* (2013.01)

(58) Field of Classification Search
CPC ............... F01D 5/284; F05D 2300/603; F05D 2300/6033; F05D 2300/6034
See application file for complete search history.

(56) References Cited

U.S. PATENT DOCUMENTS

| | | | | |
|---|---|---|---|---|
| 5,605,440 | A * | 2/1997 | Bocoviz | B29C 70/48 244/17.19 |
| 8,221,071 | B2 * | 7/2012 | Wojno | F01D 9/041 415/208.1 |
| 9,470,243 | B2 * | 10/2016 | Ishigure | F01D 5/282 |
| 10,107,191 | B2 * | 10/2018 | Gilson | F01D 25/162 |
| 2005/0129514 | A1 * | 6/2005 | Mons | F01D 9/042 415/209.4 |
| 2009/0317246 | A1 | 12/2009 | Lutz et al. | |
| 2010/0080697 | A1 * | 4/2010 | Wojno | F01D 25/162 415/208.2 |
| 2010/0111685 | A1 | 5/2010 | Sjunnesson et al. | |
| 2012/0070270 | A1 * | 3/2012 | Ravey | F01D 5/22 267/141 |
| 2013/0287562 | A1 * | 10/2013 | Ishigure | F02K 3/06 415/208.1 |
| 2014/0140832 | A1 * | 5/2014 | Hasting | F01D 9/04 415/190 |
| 2014/0212284 | A1 * | 7/2014 | Jamison | F01D 9/042 29/889 |
| 2016/0090909 | A1 * | 3/2016 | Gilson | F04D 29/544 415/208.2 |
| 2016/0326896 | A1 * | 11/2016 | Jamison | F01D 9/041 |

OTHER PUBLICATIONS

French Application No. 1759977, Search Report and Written Opinion dated Jun. 14, 2018, 7 pgs. (in French, relevance found in citations).

* cited by examiner

TURBINE ENGINE COMPRISING A STRAIGHTENING ASSEMBLY

CROSS-REFERENCE TO RELATED APPLICATION

This application claims priority to French Patent Application No. 1759977, filed Oct. 23, 2017, which is incorporated herein by reference.

FIELD

The present invention relates to an air flow straightening stage for a turbine engine and, more specifically, an air flow straightening assembly placed downstream of a fan in a secondary flow.

BACKGROUND

A dual-flow turbine engine consists of a fan whose outlet flow is divided into a primary flow, directed towards the compressors, the combustion chamber and the turbines of the turbine engine, and a secondary flow providing an essential part of the thrust.

In order to limit aerodynamic losses and thus improve the thrust, the secondary flow must be straightened so that it flows in an axial direction as far as possible.

To achieve this, turbine engines include straightening assemblies comprising fixed vanes commonly referred to as outlet guide vanes (OGVs) with a leading and trailing edge between which extend a pressure surface and a suction surface to straighten the air flow.

In order to reduce the mass of a turbine engine, certain parts, usually made of metal, are gradually being replaced by parts made of composite materials. This is particularly the case for straightening stages, which can be made of composite materials, since they are placed in the cold parts of the turbine engine, i.e. upstream of the combustion chamber, and therefore are not subjected to high heat.

Figure 1:
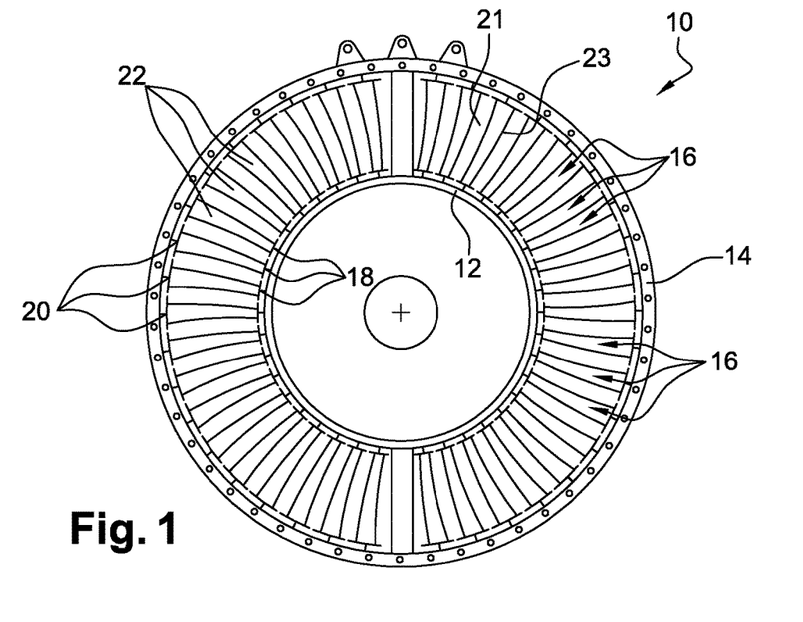
FIG. 1 is a schematic view of a straightening assembly of the prior art.

Patent application WO 2014/076408, on behalf of the applicant, discloses an air flow straightening assembly 10 for a turbine engine, as shown in FIG. 1, comprising two, respectively radially inner and outer, coaxial shells 12, 14 between which extend stator vanes 16 that are fastened to a first end portion 18 on the radially inner shell 12 and to a second end portion 20 on the radially outer shell 14. The vanes 16 can be made of composite material and include a useful part 22 extending between the two end portions 18, 20 and defining a pressure surface 21 and a suction surface 23 intended to straighten the air flow.

While such an assembly allows for the turbine engine to be lightened, it can still be improved.

Firstly, the vane cross-section could be further reduced to gain mass. However, the forces to which the vanes are subjected during operation do not currently allow the vane cross-section to be reduced without increasing the risk of debonding the fibre layers that make up the vanes.

Secondly, the effectiveness of the straightening assembly of the prior art is not optimal. The formation of vortices has indeed been observed in the vicinity of the suction side of the vanes, at the location where the vane is fastened to the radially inner shell, where these vortices then generate turbulence in the air flow at the outlet of the straightening assembly, which reduces the propulsive efficiency of the turbine engine.

Furthermore, during operation, the straightening assembly is subjected to a torsional force about its axis that is applied to the inner or outer shell, which has a tendency to rotate the inner shell with respect to the outer shell. Therefore, simply reducing the mass of the vanes, and, more specifically, in their cross-section, would not increase their mechanical strength.

Figure 2:
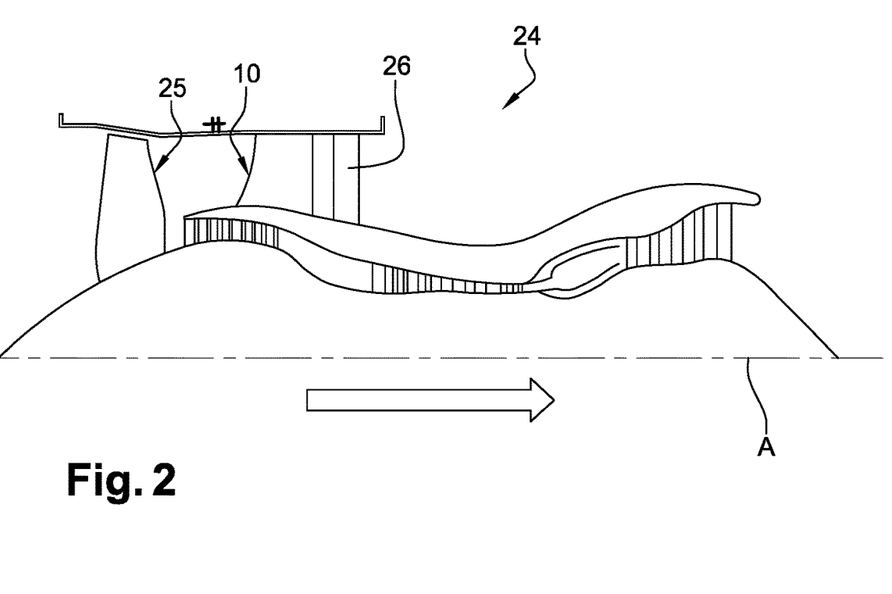
FIG. 2 is a simplified half-section of a turbine engine comprising a straightening assembly according to the prior art.

FIG. 2 shows a simplified half-section of a turbine engine 24 comprising, from the upstream end to the downstream end, a fan wheel 25, a straightening assembly 10 and structural arms 26 allowing for the passage of ancillaries, such as cables or pipes, for example.

Moreover, the structural arms 26 serve to ensure the rigidity of the turbine engine 24 and the transfer of loads relative to the bonding with the aircraft.

Such structural arms 26 increase the mass of the turbine engine 24 and can disrupt the air flow at the outlet of the straightening assembly 10.

While increasing the angle of inclination may appear desirable to reduce air vortices at the radially inner shell, this is nevertheless detrimental to the mechanical strength of the assembly when it is to serve a structuring function, for example the transfer of loads relative to the bonding with the aircraft.

The invention more particularly aims at providing a simple, efficient and cost-effective solution to these problems.

SUMMARY OF THE INVENTION

For this purpose, the present document relates to a dual-flow turbine engine comprising a fan wheel arranged at the upstream end of the turbine engine and a straightening assembly placed axially downstream of the fan wheel, said assembly comprising two radially inner and outer coaxial shells between which extend vanes made of composite material, the radially inner shell being arranged around a compressor and delimiting with the radially outer shell an annular stream for the flow of a secondary air flow, the vanes being fastened at a first end portion on the radially inner shell and at a second end portion on the radially outer shell, the vanes further comprising a useful part extending between said first and second end portions, wherein:
a) for each vane, in a plane perpendicular to the axis of the radially inner and outer shells, a straight line passing through a junction between said first and second end portions and the useful part forms an angle α with a radius of the radially inner shell, passing through the junction between said first end portion and the useful part of said vane, such that 0°<α≤30°;
b) the difference in radius between the inner and outer shells may range from 200 to 900 mm;
c) the number of vanes ranges from 25 to 45.

Such a turbine engine including the characteristics of points a), b), and c) above offers a good compromise between the number of vanes that are useful to efficiently straighten the air and the aim of lightening the turbine engine. In addition, the vanes' inclination with respect to the shell radius serves to reduce the formation of vortices at the root of the vane.

The radially inner shell can have a diameter ranging from 1,000 mm to 1,600 mm.

The angle α can range from 10° to 30°. The diameter of the inner shell can range from 1,000 to 1,200 mm. The number of vanes can range from 30 to 40.

The diameter of the radially inner shell can be 1,000 mm, the angle α can be 10° and the assembly can include 45 vanes.

The diameter of the radially inner shell can be 1,100 mm, the angle α can be 30° and the assembly can include 30 vanes.

The diameter of the radially inner shell can be 1,200 mm, the angle α can be 20° and the assembly can include 36 vanes.

The secondary stream can be free of any structural arm upstream of the straightening assembly.

In this case, the vanes perform the structuring function, i.e. the load transfer and, if necessary, the passage of ancillaries, such as cables or pipes, for example. The combinations of the angle α and the number of vanes mentioned above enable the assembly to provide the structuring function.

Moreover, the fact that the straightening assembly provides the structuring function allows further reducing the mass of the turbine engine.

At least one among the first end portion and the second end portion may be curved in a first direction that is circumferential with respect to the useful part of the vane.

Said first circumferential direction can be directed towards a suction surface of an adjacent vane.

The first end portion or the second end portion may be curved in a first direction that is circumferential with respect to the useful part of the vane, and the other of the second end portion or the first end portion may be curved in a second direction that is opposite to the first direction.

The second end portion may comprise a first strip for bonding to the radially outer shell curved in the first circumferential direction with respect to the useful part of the vane and a second strip for bonding to the radially outer shell curved in a second circumferential direction that is opposite to the first circumferential direction.

Such configurations of the end portions allow for the composite vanes to operate both under compressive and tensile loads, which increases the service life of the vanes.

The first end portion can be substantially straight and extend substantially in line with the useful part of the vane.

The radially inner shell may include breaks on its radially outer periphery that are suitable for receiving the first end portion of the vanes.

In combination with vanes whose first end portion is substantially straight and substantially in line with the useful part, the breaks allow for simple, fast and easy fastening of the vanes to the radially inner shell.

The radially inner shell can have the same number of breaks as the number of vanes in the assembly.

In addition, the vanes can define a pressure surface and a suction surface.

Moreover, each of the first end portion and the second end portion may comprise a first strip for bonding to the radially outer shell curved in the first circumferential direction with respect to the useful part of the vane and a second strip for bonding to the radially outer shell curved in a second circumferential direction that is opposite to the first circumferential direction.

BRIEF DESCRIPTION OF THE FIGURES

The invention will be better understood and other details, characteristics, and advantages of the invention will appear on reading the following description given by way of non-limiting example and with reference to the accompanying drawings, in which.

DETAILED DESCRIPTION

In the following description, elements that are identical in the prior art and in the invention are designated using the same reference numbers.

Figure 3:
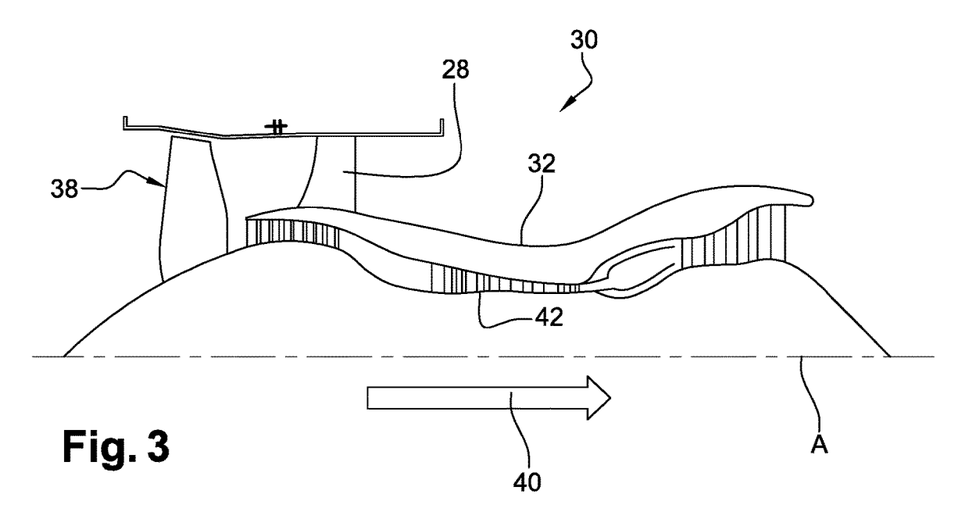
FIG. 3 is a simplified half-section of a turbine engine comprising a straightening assembly according to the invention.
Figure 11:
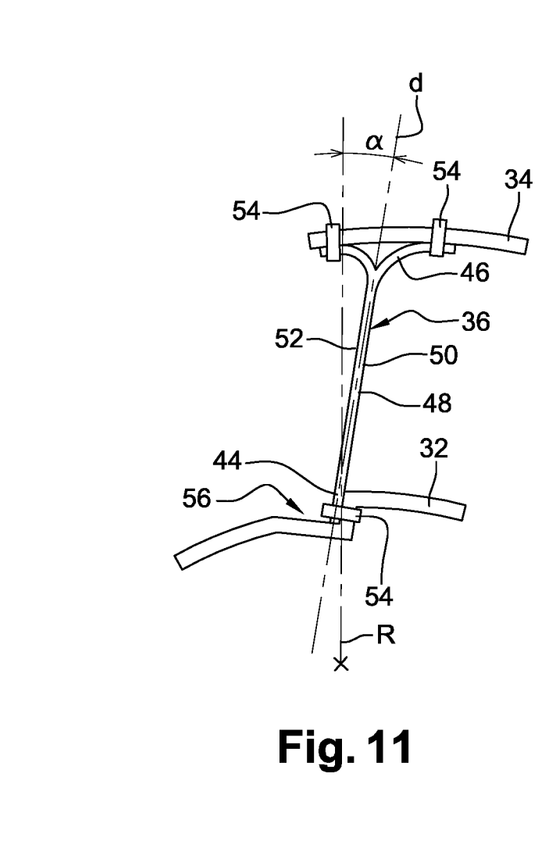
FIG. 11 is a schematic view showing the fastening of a vane according to a third embodiment of the invention.

FIGS. 3 and 11 show several embodiments of a straightening assembly 28 according to the invention.

A schematic representation of a half-section of a turbine engine 30 comprising the straightening assembly 28 according to the invention is shown in FIG. 3.

It should be noted that the turbine engine 30 is free of structural arms downstream of the straightening assembly 28. In fact, in this case, it is the straightening assembly 28 itself that provides the structuring function, which the structural arms provide in the turbine engine of the prior art.

This assembly 28 includes two respectively radially inner 32 and outer 34 coaxial shells between which extend vanes 36. The vanes 36 are advantageously made of composite material so as to reduce the mass of the straightening assembly 28.

The outer shell 34 preferably has a diameter ranging from 1,000 to 1,600 mm.

The number of vanes 36 equally preferably ranges from twenty-five to forty-five.

As shown in FIG. 3, the straightening assembly 28 is placed downstream of a fan wheel 38, with the arrow 40 representing the direction of the air flow within the turbine engine 30 and the radially inner shell 32 surrounding the low-pressure compressor 42.

The vanes 36 of the straightening assembly 28 are fastened to a first end portion 44 on the radially inner shell 32 and a second end portion 46 on the radially outer shell 34, and include a useful part 48 that extends between the two end portions 44, 46 and defines a pressure surface 50 and a suction surface 52 used to straighten the secondary flow so that if flows in a substantially laminar manner downstream of the straightening assembly 28.

On the vanes 36, the pressure surface 50 is directed towards the radially inner shell 32 and the suction surface 52 is directed towards the radially outer shell 34.

Figure 4:
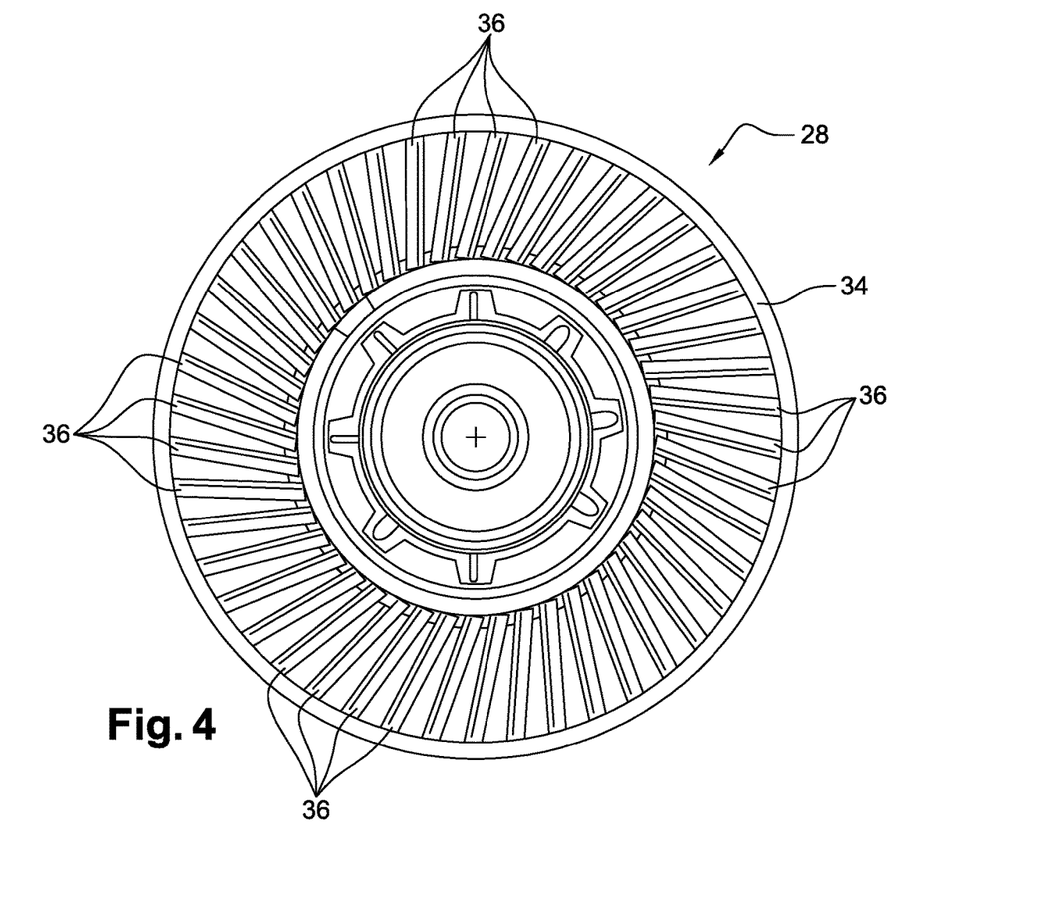
FIG. 4 is a simplified front view of the straightening assembly according to a first embodiment of the invention.
Figure 5:
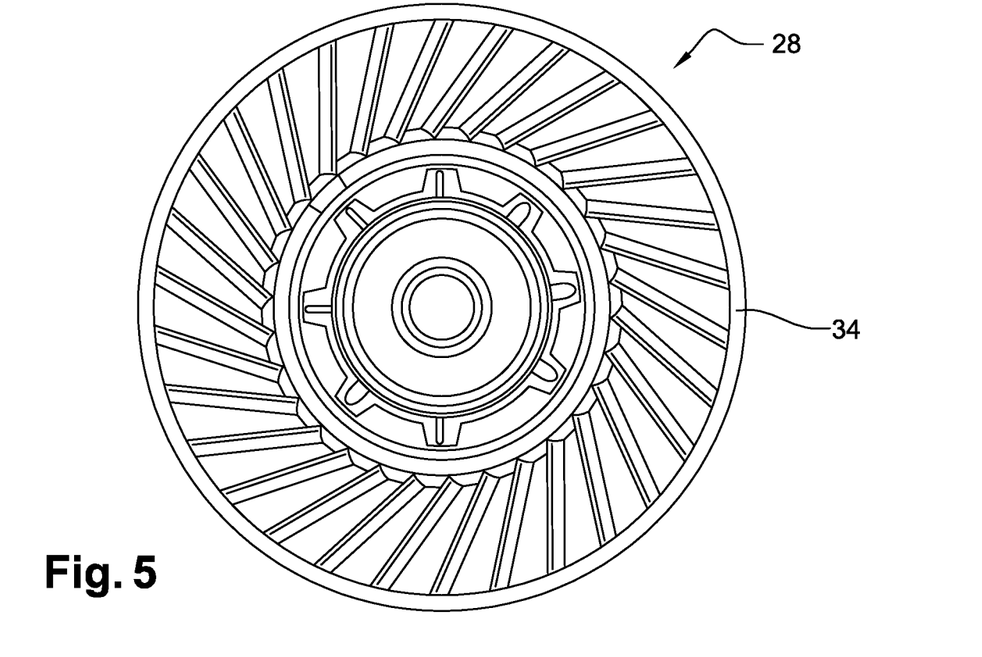
FIG. 5 is a simplified front view of the straightening assembly according to a second embodiment of the invention.
Figure 6:
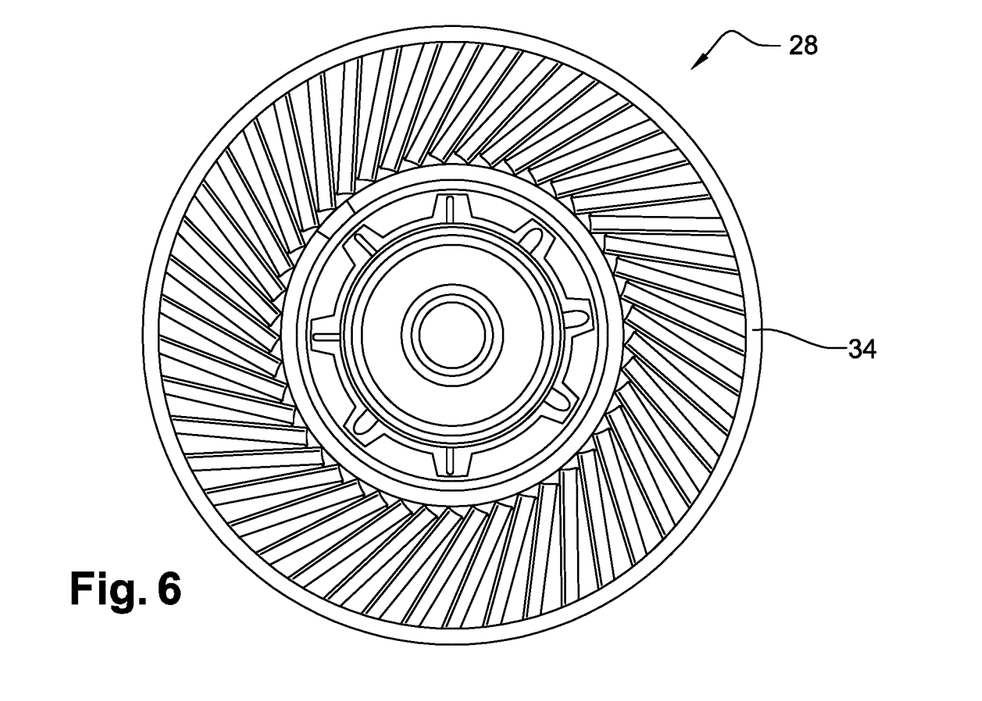
FIG. 6 is a simplified front view of the straightening assembly according to a third embodiment of the invention.

FIGS. 4 to 6 respectively show a straightening assembly 28 according to a first, second and third embodiment.

In the first and second embodiments, shown in FIGS. 4 and 5, the assembly includes forty-five composite vanes 36.

In the third embodiment, shown in FIG. 6, the assembly includes thirty composite vanes 36.

Composite vanes 36 among others offer better resistance to tensile and compressive stresses than the metal vanes generally used in assemblies of the prior art.

Figure 7:
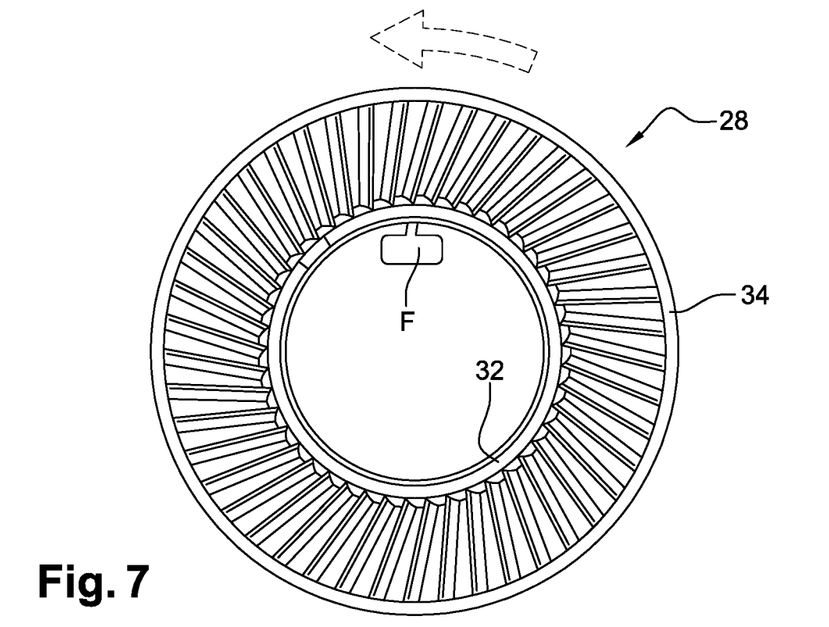
FIG. 7 is a schematic view showing the fastening of the turbine engine according to a first embodiment of the invention.
Figure 8:
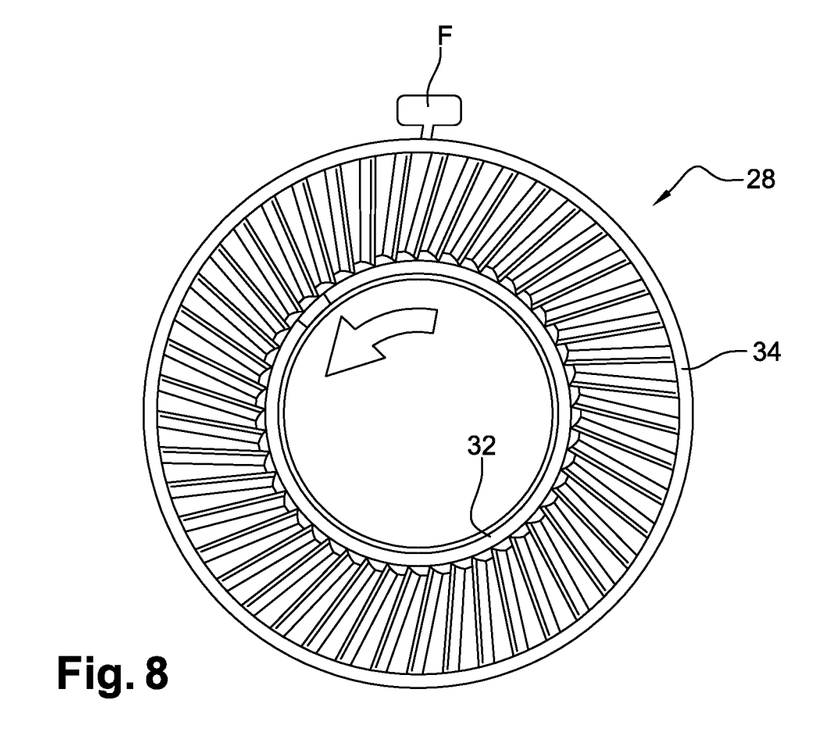
FIG. 8 is a schematic view showing the fastening of the turbine engine according to a second embodiment of the invention.

FIGS. 7 and 8 show two types of fastening F for mounting the turbine engine 30 onto an aircraft, the fastenings F being shown schematically in the figures.

In the first type shown in FIG. 7, the turbine engine is fastened to the aircraft by its radially inner shell. Also, during operation, the rotation of the fan wheel 28, as shown by the dotted arrow in FIG. 7, imparts torsional stress to the shell, which has a tendency to make the radially outward shell rotate counter-clockwise when considering the direction of air flow. This rotational movement also causes the vanes of the assembly of the prior art operate under bending loads. However, in the assembly 28 of the present invention, the vanes operate under compressive loads.

In the second type shown in FIG. 8, the turbine engine 30 is fastened to the aircraft by its radially outer shell 34. Therefore, during operation, the rotation of the fan wheel 38, as shown by the solid line arrow in FIG. 8, causes torsional stress on the shell, which has a tendency to make the radially inner shell rotate counter-clockwise when considering the direction of the air flow. This rotational movement then causes the vanes of the assembly of the prior art to operate under bending loads. However, in the assembly 28 of the present invention, the vanes 36 operate under tensile loads.

Figure 9:
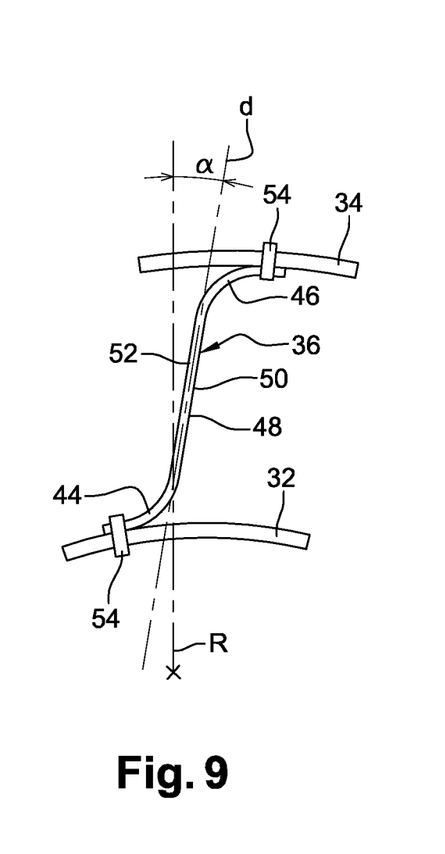
FIG. 9 is a schematic view showing the fastening of a vane according to a first embodiment of the invention.
Figure 10:
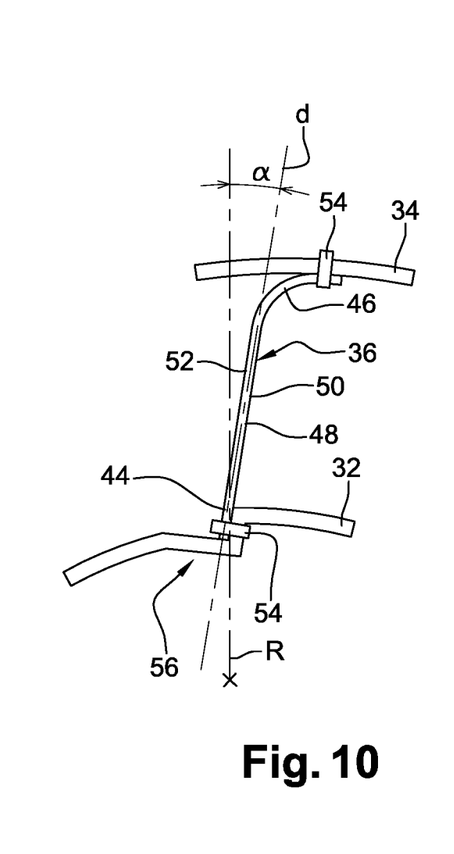
FIG. 10 is a schematic view showing the fastening of a vane according to a second embodiment of the invention.

Composite vanes 36 are inclined with respect to the radii R of the radially inner shell 32. More specifically, as shown in FIGS. 9 to 11, the useful part of each vane has an angular offset with respect to a radius R of the radially inner shell 32 passing through the fastening 54 between the vane 36 concerned and the radially inner shell 32.

A straight line (reference "d" in FIGS. 9 to 11) is drawn through the junction between said first and second end portions 44, 46 and the useful part 48 of the vane 36, this straight line forming an angle α with the radius R of the radially inner shell, passing through the junction between the first end portion 44 and the useful part 48 of said vane 36, such that 0<α≤30°.

In the first embodiment, shown in FIG. 4, the vanes 36 are inclined at an angle α of 10°.

In the second and third embodiments, shown in FIGS. 5 and 6, the vanes 36 are inclined at an angle α of 30°.

The formation of an angle α between the useful part 48 of the vane 36 and the radius R of the radially inner shell 32 reduces the formation of corner vortices between the pressure surface 50 of the vane 36 and the suction surface 52 of an immediately adjacent vane 36, at the level of the inner shell 32. This results in a better air flow and, therefore, a better efficiency of the turbine engine 30.

Furthermore, this angle α also increases the service life of the vanes 36 compared to vanes of the prior art, since composite vanes 36 offer better tensile and compressive strength when they are inclined with respect to the radii R of the inner shell 32 to which they are fastened.

The tables below provide examples of how to produce a straightening assembly according to the diameter of the radially inner shell 32 and to the diameter of the radially outer shell 34. For each diameter of the radially inner shell 32, various values can be combined, on the one hand, with the number of vanes and, on the other, with the value of the angle α. The difference in diameter specified in the table below is measured between the radially outer surface of the inner shell and the radially inner surface of the outer shell, for example at the axial level halfway along the chord of the vanes 36.

| Radial distance available to mount vanes between the inner and outer shells | Alpha (in degrees) | Number of vanes |
|---|---|---|
| 200 | Between 20 and 30 | Between 25 and 40 |
| 200 | Between 0 and 20 | Between 25 and 45 |
| 900 | Between 20 and 30 | Between 25 and 35 |
| 900 | Between 10 and 20 | Between 25 and 40 |
| 900 | Between 0 and 10 | Between 25 and 45 |

| Diameter of the radially inner shell (mm) | Diameter of the radially outer shell (mm) | Difference in radius | Number of vanes | Angle α (°) |
|---|---|---|---|---|
| 1,000 | 2,000 | 500 | 25 | 30 |
| 1,000 | 2,800 | 900 | 25 | 30 |
| 1,000 | 2,800 | 900 | 30 | 20 |
| 1,000 | 2,000 | 500 | 36 | 10 |
| 1,000 | 2,400 | 700 | 40 | 15 |
| 1,000 | 2,800 | 900 | 45 | 10 |
| 1,100 | 2,300 | 600 | 30 | 30 |
| 1,200 | 2,000 | 400 | 36 | 20 |
| 1,300 | 2,300 | 500 | 36 | 20 |
| 1,400 | 2,600 | 600 | 45 | 10 |
| 1,600 | 2,800 | 600 | 45 | 15 |

From this table, it can therefore be understood that, for a radially inner shell 32 having a given diameter, taking into account the size of the outer shell and the mechanical strength of the vanes, the number of vanes can change and the angle α can be such that 0°≤α≤30°, for example at least 3 degrees. FIGS. 9 to 11 also highlight different methods for fastening the vanes to the radially inner 32 and outer 34 shells. More specifically, for a given angle α, the greater the difference in radius between the inner and outer shells, the fewer vanes can be fitted from a geometrical standpoint. For a given value of difference in radius, the number of vanes can be increased by decreasing the angle. The diameter parameter of the radially inner shell 32 is taken into consideration for the largest values in terms of angle and number of vanes.

In a first embodiment shown in FIG. 9, the first end portion 44 and the second end portion 46 used to fasten the vane 36 to the radially inner shell 32 and to the radially outer shell 34, respectively, may be curved to ensure that the angle α is observed.

Thus, at least one of the end portions 44, 46 can be curved in a first circumferential direction with respect to the useful part 48 of the vane 36. Said first circumferential direction is advantageously directed towards the suction surface 52 of an adjacent vane 36.

However, each end portion 44, 46 can also be curved in a second circumferential direction towards the pressure surface 50 of an adjacent vane 36.

In FIG. 9, the first end portion 44 is curved in the second direction and the second end portion 46 is curved in the first direction.

The second embodiment shown in FIG. 10 differs from the first embodiment in that the first end portion 44 of the vane 36 is straight and is substantially in line with the useful part 48 of the vane 36.

To allow the first end portion 44 to be fastened, the radially inner shell 32 includes breaks 56 forming walls that extend radially and against which the first part 44 of the vanes 36 comes to rest.

The third embodiment shown in FIG. 11 differs from the first embodiment in that the second end portion 46 of the vane 36 is divided into two bonding strips, also called debondings. A first bonding strip is curved in the first circumferential direction, i.e. in the circumferential direction with respect to the useful part of the vane 36 towards the suction surface 52 of an adjacent vane 36, and a second bonding strip is curved in a second circumferential direction opposite to the first circumferential direction.

The embodiments of the vanes' 36 fastening to the shells 32, 34 particularly allow for the vanes 36 of the present invention to be simplified with respect to the vanes of the prior art. As a matter of fact, it is no longer necessary to provide the vane roots and tips with locking tabs to secure the vane to the shells, which form a substantially right angle with the useful part of the vane and therefore an area that is highly subject to mechanical stress.

The vanes are advantageously fastened to the radially inner and outer shells by bolting 54 the end portions 44, 46 and bonding strips, if necessary, to said radially inner 32 and outer 34 shells.

This fastening method offers the advantage of good mechanical resistance to the stress to which the vane 36 is subjected and allows for quick assembly and disassembly in order to facilitate and accelerate maintenance operations.

The air flow straightening assembly 28 and the turbine engine 30 described above have many advantages, including the following:

Better mechanical strength of the vanes 36
Better aerodynamic performance
Mass gain and lower environmental impact
Lower manufacturing cost and easy maintenance The good mechanical resistance of the vanes 36 is achieved by the way in which the vanes 36 are positioned, in particular the angle α, which allows the vanes 36 to operate both under tensile and compressive loads depending on the type of fastening used for the turbine engine 30. Unlike the vanes of the prior art, which mainly operate under bending loads, the vanes 36 of this straightening assembly 28 have a longer service life and greater fatigue strength.

The aerodynamic performance is improved, compared to the prior art, by the way in which the vanes 36 are positioned, in particular owing to the angle α, which makes it possible to enlarge the suction surface 52 of the vanes 36 and therefore the useful part 48 of the vanes 36. Moreover, the fact that there is the angle α reduces the effects of vortices from the corner to the root of the 36 vanes. This results in a more laminar air flow, which increases the performance of the turbine engine 30.

The performance of the turbine engine 30 is also increased by reducing the mass and thus reducing consumption. In fact, the removal of the structural arms of the prior art de facto leads to reducing the mass of the turbine engine 30, and, consequently, reduces its energy consumption, so that the turbine engine 30 has a lower environmental impact. Moreover, the use of composite materials, as opposed to using metallic materials, also reduces the mass of the turbine engine 30.

Finally, manufacturing and maintenance costs are also reduced, in particular owing to the quick fastening (by bolting) of the vanes 36 on the radially inner 32 and outer 34 shells, which speeds up service calls by maintenance technicians. In addition, the fact that the vanes 36 can operate both under tensile and compressive loads also reduces their deterioration, which in turn reduces the frequency of preventive and/or curative maintenance periods.

The invention claimed is:

1. A dual-flow turbine engine (30) comprising a fan wheel (38) arranged at an upstream end of the turbine engine (30) and a straightening assembly (28) positioned axially downstream of the fan wheel (38), said assembly (28) comprising two radially inner and outer coaxial shells (32, 34) between which extend vanes (36) made of composite material, the radially inner shell (32) being arranged around a compressor and delimiting with the radially outer shell (34) an annular stream for the flow of a secondary air flow, the vanes (36) being fastened at a first end portion (44) on the radially inner shell (32) and at a second end portion (46) on the radially outer shell (34), the vanes (36) further comprising a useful part (48) extending between said first and second end portions (44, 46), characterized in that:
   a) for each vane (36), in a plane perpendicular to the axis of the radially inner and outer shells (32, 34), a straight line (d) passing through a junction between said first and second end portions (44, 46) and the useful part (48) forms an angle α with a radius (R) of the radially inner shell (32) passing through the junction between said first end portion (44) and the useful part (46) of said vane (36) such that 0°<α≤30°,
   b) the difference in radius between the inner (32) and outer (34) shells ranges from 200 to 900 mm;
   wherein the radially inner shell (32) comprises, on its radially outer periphery, breaks (56) forming walls that extend radially between a radially outer surface of a first portion of the radially inner shell (32) and a radially inner surface of a second portion of the radially inner shell (32), a pressure surface of the first end portion (44) of the vanes (36) resting against and fastened to said breaks.

2. The turbine engine according to claim 1, wherein the number of vanes (36) ranges from 25 to 45.

3. The turbine engine according to claim 2, wherein the radially inner shell (32) has a diameter ranging from 1,000 mm to 1,600 mm.

4. The turbine engine according to claim 3, wherein the angle α ranges from 10 to 30 degrees.

5. The turbine engine (30) according to claim 4, wherein the outer shell has a diameter from 2,000 to 2,800 mm.

6. The turbine engine (30) according to claim 3, wherein the diameter of the inner shell (32) ranges from 1,000 mm to 1,200 mm and the number of vanes (36) ranges from 30 to 40.

7. The turbine engine (30) according to claim 2, wherein the outer shell has a diameter from 2,000 to 2,800 mm.

8. The turbine engine (30) according to claim 1, wherein the radially inner shell (32) has a diameter ranging from 1,000 mm to 1,600 mm.

9. The turbine engine (30) according to claim 1, wherein the diameter of the radially inner shell (32) is 1,000 mm, the angle α is 10° and the assembly comprises 45 vanes (36).

10. The turbine engine (30) according to claim 1, wherein the diameter of the radially inner shell (32) is 1,100 mm, the angle α is 30° and the assembly comprises 30 vanes (36).

11. The turbine engine (30) according to claim 1, wherein the diameter of the radially inner shell (32) is 1,200 mm, the angle α is 20° and the assembly comprises 36 vanes (36).

12. The turbine engine (30) according to claim 1, wherein the secondary stream lacks a structural arm upstream of the straightening assembly (28).

13. The turbine engine (30) according to claim 12, wherein the outer shell has a diameter from 2,000 to 2,800 mm.

14. The turbine engine (30) according to claim 1, wherein at least one among the first end portion (44) and the second end portion (46) is curved in a first direction that is circumferential with respect to the useful part of the vane.

15. The turbine engine (30) according to claim 14, wherein said first circumferential direction is directed towards a suction surface (52) of an adjacent vane (36).

16. The turbine engine (30) according to claim 14, wherein the second end portion (46) comprises a first strip for bonding to the radially outer shell (34) curved in the first circumferential direction with respect to the useful part (48) of the vane (36) and a second strip (34) for bonding to the radially outer shell curved in a second circumferential direction that is opposite to the first circumferential direction.

17. The turbine engine (30) according to claim 1, wherein the first end portion (44) is straight and extends in line with the useful part (48) of the vane (36).

18. The turbine engine (30) according to claim 1, wherein the radially inner shell (32) comprises a number of breaks (56) identical to the number of vanes (36) in the assembly (28).

19. The turbine engine (30) according to claim 1, wherein the outer shell has a diameter from 2,000 to 2,800 mm.

\* \* \* \* \*